United States Patent [19]

Merz et al.

[11] 4,407,976
[45] Oct. 4, 1983

[54] ANIONIC ADSORBENT

[75] Inventors: Jürg Merz, Therwil; Hans Wegmüller, Riehen; Rudolf F. Wurster, Pfeffingen, all of Switzerland

[73] Assignee: Ciba-Geigy Corporation, Ardsley, N.Y.

[21] Appl. No.: 271,882

[22] Filed: Jun. 9, 1981

[30] Foreign Application Priority Data

Jun. 16, 1980 [CH] Switzerland ............... 4616/80

[51] Int. Cl.³ .................. C08G 12/00; C08G 69/46
[52] U.S. Cl. ......................................... 521/36
[58] Field of Search ............ 521/30, 35, 36, 39; 523/310; 528/254, 256, 259

[56] References Cited

U.S. PATENT DOCUMENTS

| | | | |
|---|---|---|---|
| 4,133,929 | 1/1979 | Bowes et al. | 428/260 |
| 4,178,438 | 12/1979 | Haase et al. | 536/30 |
| 4,263,146 | 4/1981 | Wegmüller et al. | 210/679 |
| 4,316,005 | 2/1982 | Wurster et al. | 528/256 |

FOREIGN PATENT DOCUMENTS 733100  7/1955  United Kingdom .

*Primary Examiner*—Lucille M. Phynes
*Attorney, Agent, or Firm*—Edward McC. Roberts

[57] ABSTRACT

An anionic adsorbent which has been prepared by reacting (a) a monomeric compound which contains at least one anionic group and at least one amide group, especially a carboxamide group, which can be methylolated, with (b) an aminoplast precondensate which is free from salt-forming anionic groups.

The novel adsorbent is particularly suitable for removing cationic substances, such as cationic dyes, and a heavy metal ions from aqueous solutions, especially from effluents.

14 Claims, No Drawings

ANIONIC ADSORBENT

The present invention relates to an anionic adsorbent which is capable of removing cationic materials and/or heavy metal ions from aqueous solutions, especially from effluent, for example filtrates, residual liquors of bleaching or dyeing processes, flushing water and wash water.

The novel adsorbent is obtained by reacting (a) a monomeric compound which contains at least one anionic group and at least one amide group, especially a carboxamide group, which can be methylolated, with (b) an aminoplast precondensate which is free from salt-forming anionic groups.

Component (b) is a compound which contains methylolated amide groups but does not contain any salt-forming anionic groups. Components (a) and (b) together advantageously contain at least two N-methylolamide groups, which can be etherified.

It is particularly advantageous to prepare the adsorbent from a monomeric compound (a) which corresponds to the formula

$$Z-Q-CO-N-X \quad (1)$$
$$\phantom{Z-Q-CO-N-}Y$$

in which X is hydrogen or $-CH_2OH$, Y is hydrogen, lower alkyl or $-CH_2OH$, Q is alkylene having 1 to 8 carbon atoms, preferably 2 to 6 carbon atoms and Z is the carboxyl group or the acid radical of a polybasic, inorganic oxyacid, or $-CO-Q-Z$ is the acid radical of a dicarboxylic acid containing this inorganic acid radical, in which the terminal carboxyl group of the dicarboxylic acid can be replaced by the group of the formula

$$X-N-CO-. \quad (1a)$$
$$\phantom{X-N-}Y$$

Methylolamide compounds of the formula (1) which contain only one group of the formula (1a), are particularly preferred. Z is in that case advantageously a phosphoric acid group and especially a sulfonic acid group. The acid radical Z is preferably present in a salified form, for example as an alkali metal salt or ammonium salt.

Q is advantageously $C_1$–$C_3$-alkylene or, preferably $C_2$–$C_3$-alkylene, for example ethylene, propylene or isopropylene. Such methylolamide compounds of the formula (1) can be obtained, for example, by reacting an inorganic derivative of sulfurous acid or phosphorous acid with an amide of a 1,2-unsaturated aliphatic carboxylic acid and methylolating the reaction product with formaldehyde or with a formaldehyde donor, for example paraformaldehyde or trioxane. Examples of suitable derivatives of sulfurous acid or phosphorous acid are sodium bisulfite, sodium metabisulfite, sodium phosphite and alkali metal salts of a mono-$C_1$–$C_5$-alkyl phosphite, whilst examples of suitable amides are acrylamide, methacrylamide, itaconamide, fumaramide and maleamide.

Preferred components (a) are methylolamide compounds of the formula

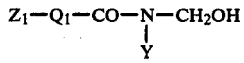

$$Z_1-Q_1-CO-N-CH_2OH \quad (2)$$
$$\phantom{Z_1-Q_1-CO-N-}Y$$

in which $Q_1$ is $C_1$–$C_3$-alkylene which is unsubstituted or is substituted by $-COOH$ or by the group of the formula

$$-CO-N-CH_2OH, \quad (2a)$$
$$\phantom{-CO-N-}Y$$

$Z_1$ is $-SO_3M$ or

$$-\underset{\underset{OR}{|}}{\overset{\overset{O}{\|}}{P}}-OM,$$

R is lower alkyl, especially methyl, or the cation M, M is hydrogen, an alkali metal, for example sodium or potassium, or ammonium, and Y is as defined above. Particularly preferred methylolamide compounds of the formula (2) are those in which $Q_1$ is $C_2$–$C_3$-alkylene, $Z_1$ is $-SO_3M$ and Y is hydrogen or $-CH_2OH$. R is preferably hydrogen or lower alkyl. M can also be another metal, for example an alkaline earth metal, such as calcium or magnesium, or copper or silver.

Other suitable components (a) include melamine compounds and urea compounds which contain at least one N-methylol group and at least one N-sulfo-$C_1$–$C_3$-alkyl group, especially an N-sulfoethyl group, or at least one sulfated N-methylol group ($-CH_2O-SO_3M$).

Particularly suitable compounds are N-methylolmelamines of the formula

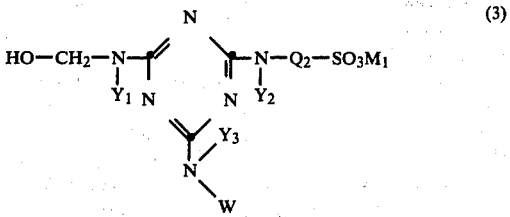

in which W is hydrogen, $-CH_2OH$ or $-Q_2-SO_3M_1$, $Y_1$ is hydrogen, lower alkyl, $-CH_2OH$ or $-Q_2-SO_3M_1$, $Y_2$ and $Y_3$, independently of one another, are hydrogen, lower alkyl or $-CH_2-OH$, $Q_2$ is $C_2$–$C_3$-alkylene and $M_1$ is hydrogen, sodium, potassium or ammonium. $Y_1$ is advantageously lower alkyl or $-CH_2-OH$ and preferably hydrogen; $Y_2$ and $Y_3$ are preferably hydrogen and $Q_2$ is, in particular, ethylene.

Preferred melamine derivatives which may be used as component (a) are hexamethylolmelamines which contain one to five sulfated N-methylol groups ($-CH_2-O-SO_3M_1$).

In the definition of the radicals present in the N-methylolamide compounds, lower alkyl and lower alkoxy are, as a rule, groups having 1 to 5, especially 1 to 3, carbon atoms, for example methyl, ethyl, n-propyl, isopropyl, n-butyl, sec.-butyl or amyl, or methoxy, ethoxy or isopropoxy, respectively. Halogen, in the context of all substituents, is, for example, fluorine, bromine or, preferably, chlorine.

Typical examples of monomeric compounds of the formulae (1), (2) and (3) which can be used as component (a) are amide compounds of the formulae $$NaO_3S-CH_2CH_2-CONH_2 \quad (4)$$

$$NaO_3S-CH_2CH_2-NH-CO-NH_2 \quad (5)$$

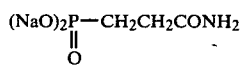
(6)

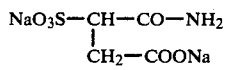
(6a)

$$NaO_3S-\underset{\underset{CH_2-COONa}{|}}{CH}-CO-NH_2 \quad (7)$$

$$NaO_3S-CH_2-CH_2-CH_2-CO-NH_2 \quad (8)$$

and the corresponding monomethylolated and dimethylolated amide compounds, as well as

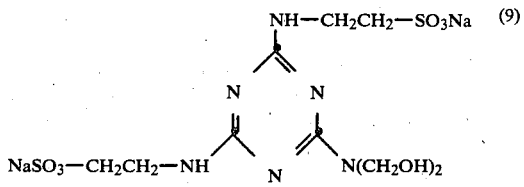
(9)

Suitable components (b) are adducts of formaldehyde with amide compounds which can be methylolated and which do not contain any salt-forming anionic groups, for example ureas, thioureas and amino-1,3,5-triazines.

Suitable urea and thiourea compounds are urea, thiourea, substituted ureas, such as alkylureas or arylureas, alkyleneureas and alkylenediureas, such as ethyleneurea, propyleneurea, dihydroxyethyleneurea, hydroxypropyleneurea and acetylenediurea, as well as dicyandiamide, dicyandiamidine, urones and hexahydropyrimidones.

Examples of amino-1,3,5-triazines are melamine, N-substituted melamines, for example N-methyl-, N-ethyl-, N-propyl- and N-butyl-melamine, triazones, ammeline, guanamines, for example benzoguanamine and acetoguanamine, diguanamines and guanidines.

Both predominantly monomolecular compounds and more highly precondensed products can be used as aminoplast precondensates.

In general, both completely methylolated and partially methylolated substances, which can also be etherified, give valuable products.

The preferred methylol compounds are those of the ureas mentioned and of amino-1,3,5-triazines. Amongst these compounds, N-methylolureas and N-methylolmelamines, in particular, deserve special mention. Partial ethers of such methylol compounds, for example with alkanols having 1 to 4 carbon atoms, such as methanol, ethanol, n-propanol or n-butanol, can also be used.

Specific examples of aminoplast precondensates (b) are N,N'-dimethylolurea, methylolurea, N,N'-dimethylolurea dimethyl ether, N,N'-tetramethylolacetylenediurea, N,N'-dimethylolethyleneurea, N,N'-dimethylolpropyleneurea, 4,5-dihydroxy-N,N'-dimethylolethyleneurea, N,N'-dimethylol-5-hydroxypropyleneurea, 4-methoxy-5,5-dimethyl-N,N'-dimethylolpropyleneurea, N,N'-dimethylol-5-oxapropyleneurea, 4,5-dihydroxy-N,N'-dimethylolethyleneurea dimethyl ether, dimethylolmelamine, trimethylolmelamine, tetramethylolmelamine, hexamethylolmelamine, hexamethylolmelamine pentamethyl ether, pentamethylolmelamine dimethyl ether or trimethyl ether, N,N'-dimethylolurone dimethyl ether and hexamethylolmelamine hexamethyl ether or hexaethyl ether. Amongst these, monomethylolurea, N,N'-dimethylolurea and tris- to hexa-methylolmelamines are particularly preferred.

Mixtures of these methylolated urea and melamine compounds can also be used.

The novel anionic adsorbents are prepared by reacting (a) a monomeric compound which contains at least one anionic group and at least one amide group, which can be methylolated, with (b) an aminoplast precondensate which is free from salt-forming anionic groups, or a mixture from which such an aminoplast precondensate is formed.

The reaction is preferably carried out in a neutral or acidic medium, for example at a pH value of 2 to 7, and advantageously at a temperature of 20° to 200° C., preferably 50° to 130° C.

Preferably, a catalyst is used. Examples of suitable catalysts are organic or inorganic peroxides, or persalts.

However, preferred catalysts are inorganic and/or organic acids or their anhydrides or salts, for example sulfurous acid, sulfuric acid, sulfamic acid, phosphoric acid, hydrochloric acid, chloroacetic acid, oxalic acid, maleic acid, tartaric acid, citric acid or its anhydride, ammonium chloride, ammonium nitrate, ammonium phosphate, ammonium thiocyanate, ammonium acetate, magnesium chloride, zinc nitrate and aluminium sulfate. Sulfamic acid is particularly preferred.

The adsorbent according to the invention is advantageously synthesised from 1 mol of component (a) and 0.2 to 10 mols, preferably 0.2 to 3.5 mols, and especially 0.5 to 2 mols, of component (b).

The reaction products thus obtained as a rule contain an acid equivalent of 0.2 to 3, preferably 0.3 to 2, milliequivalents per g of anionic adsorbent.

The adsorbent according to the invention is especially suitable for removing cationic materials and heavy metal ions from aqueous solutions, especially from effluents, the efficiency of the novel adsorbent being substantially greater than the efficiencies achieved with conventional adsorbents or ion exchangers. In particular, the novel adsorbents are distinguished, relative to conventional adsorbents, for example active charcoal, by high adsorbency for materials, especially cationic materials, dissolved or dispersed in water, and for heavy metal ions present in water.

Accordingly, the present invention also provides a process for removing cationic materials and heavy metal ions from aqueous solutions, which comprises bringing an aqueous solution into contact with an anionic adsorbent according to the invention.

This process is especially suitable for purifying aqueous liquors which contain organic cationic materials or mixtures of such materials. In particular, cationic dyes, fluorescent brighteners, dyeing auxiliaries, textile auxiliaries, surfactants and mixtures of these can be abstracted, to a satisfactory degree, from effluent. By proceeding according to the invention, effluents which contain mixtures of cationic dyes with cationic auxiliaries can be successfully purified.

Because of the broad range of application of the novel adsorbent, it is possible to achieve a saving of fresh water—this being increasingly called for nowadays—by partial or even complete recirculation of the residual liquors or waste liquors which arise. The liquors involved are in particular, regardless of the apparatus used, the effluents which arise in connection with dyeing, bleaching and washing processes in the dyestuff, fibre, textile, cellulose, paper and leather industries. In the case of, for example, a dyehouse, the effluent can originate from the conventional dyeing apparatus, such as is used for dyeing loose fibre material, tow, yarn and woven or knitted fabrics, or from cleaning equipment, for example from an open-width washer.

The adsorbent according to the invention can also be employed to remove or trap heavy metal ions, and in this case, again, the efficiency of the novel adsorbent is substantially greater than the efficiency achieved with conventional adsorbents or ion exchangers.

The purification of the effluent, including the removal of the heavy metal ions, is advantageously carried out at 2° to 150° C., but preferably at 10° to 100° C., especially at 20° to 70° C. If desired, the purification of the effluent can also be carried out under pressure or vacuum. The pH value of the effluent can vary within wide limits, for example from 2 to 10. pH corrections, for example to a value of 3 to 8, can however facilitate and accelerate the purification process, depending on the nature of the adsorbent used.

The treatment of the effluent can be carried out discontinuously, semi-continuously or continuously. In principle, the following embodiments are suitable for the purposes of the invention:

(a) the (so-called) stirring process, wherein the water to be purified is stirred with the adsorbent in a vessel or a series of vessels, and is then separated off;

(b) the (so-called) fluidised bed process, in which the adsorbent is kept in suspension by the flow of the liquor which is to be purified; and (c) the (so-called) fixed bed process, wherein the liquor to be purified is passed through an adsorbent arranged in the manner of a filter.

If, amongst these three different processes, the fixed bed process (c) is employed, the following three types of apparatus arrangements are particularly suitable:

1. The treatment apparatus is fixedly connected to the adsorber unit.
2. The adsorber unit is mobile and can be coupled to any treatment apparatus, as required.
3. The effluents originating from the treatment liquors are combined in a suitable vessel and then passed conjointly through the adsorbent.

If desired, the anionic adsorbent to be used according to the invention can be mixed with other ion exchangers or adsorbents, for example active charcoal, and/or other, known, filtration aids, for example peat, kieselguhr or diatomaceous earth. In that case, for example, the active charcoal is added to the novel adsorbent in amounts of 2 to 95% by weight, preferably 10 to 70% by weight, relative to the weight of the anionic adsorbent.

Dyes which can be removed by the method of the invention from the effluents can be water-soluble or water-dispersed cationic dyes or fluorescent brighteners. The process according to the invention is preferentially suitable for removing water-soluble cationic dyes or fluorescent brighteners. The cationic dyes are, quite generally, the conventional salts of such dyes, and double salts of metal halides, for example zinc chloride, with conventional cationic dyes, whose cationic character is attributable to a carbonium, an oxonium, a sulfonium or especially an ammonium group. Examples of such chromophoric systems are methine, azomethine, azo, hydrazone, azine, oxazine, thiazine, diazine, xanthene, acridine, polyarylmethane, such as diphenylmethane or triphenylmethane, coumarine and azo dyes, which contain an indolinium, pyrazolium, triazolium, tetrazolium, oxadiazolium, thiodiazolium, oxazolium, thiazolium, pyridinium, pyrimidinium or pyrazinium ring. Further examples are arylazo, phthalocyanine and anthraquinone dyes which carry an external ammonium group, for example an external cycloammonium or alkylammonium group.

The novel adsorbent is not only suitable for decolorising residual liquors arising in dye manufacture and in textile, paper or leather dyeing, but is also very useful in removing residues of cationic fluorescent brighteners from washing and bleaching liquors.

The cationic brighteners can belong to any category of brighteners, and are, in particular, cationic brighteners of the methine, azamethine, benzofuran, benzimidazolyl, coumarin, naphthalimide or pyrazoline series.

A further advantage of the novel anionic adsorbent is that by its use it is possible to remove not only the dyes but also, at least partially, to remove cationic surfactants, textile auxiliaries and dyeings auxiliaries from aqueous residual liquors. Such auxiliaries are described in more detail in the book "Tenside-Textilhilfsmittel-Waschrohstoffe" ("Surfactants/Textile Auxiliaries/Detergent Raw Materials") by Dr. Kurt Lindner (published by Wissenschaftliche Verlagsgesellschaft, Stuttgart, 1964).

The effluents to be treated with the novel adsorbents also include various industrial effluents which contain ions of metals having a standard potential which is, as a rule, above $-1.5$ V, preferably between $-1.0$ and $+0.85$ V, at 25° C. Examples of such metal ions are $Cd^{++}$, $Cu^{++}$, $Zn^{++}$, $UO_2^{++}$, $Ni^{++}$, $Sn^{++}$, $Pb^{++}$, $Hg^{++}$, $Ag^{+}$, $Fe^{+++}$, $Cr^{+++}$ and $Co^{+++}$.

The removal of the metal ions is advantageously carried out at 10° to 100° C.

The anionic adsorbent also serves as a general cation exchanger.

By suitable choice of the adsorbent it is possible, according to the invention, to abstract up to 100% of the dissolved impurity from the effluent. Retention effects of up to 50 g of pollutant, i.e. dye, fluorescent brightener, auxiliary, detergent or tanning agent, per 100 g of adsorbent can be achieved. Preferably, residual liquors wherein the dye concentration is 0.01 to 5.0 g/l, especially 0.01 to 1.0 g/l, are decolorised. Using the adsorbent according to the invention, the metal content in the effluent can also be reduced to virtually negligible amounts of 2.5 ppm, and in some cases even less than 0.1 ppm, so that the effluent treated with the adsorbent can be discharged as if it were free from heavy metals. In cases where complete decoloration or removal of the metal ions is not achieved by only a single treatment of the effluent with the novel adsorbent, it is advisable to repeat the purification process.

After the impurities have been adsorbed, the laden adsorbents can be easily separated from the purified effluent. The adsorbents have a high solids content and can therefore be directly combusted, without prior drying. The novel adsorbents can be advantageously employed in place of flocculating agents in effluent purification, and present no overdosage problems. Furthermore, because of their good draining properties, sludge problems are avoided. In addition, the anionic adsorbents are distinguished by a retention of cationic materials in a neutral pH range. The adsorbents can, if desired, also be regenerated with the aid of, for example, a dilute aqueous mineral acid solution.

In the examples which follow, all percentages are by weight.

EXAMPLE 1

85.2 g of a 53% aqueous solution of a compound of the formula

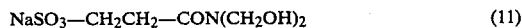
$$NaSO_3-CH_2CH_2-CON(CH_2OH)_2 \quad (11)$$

are brought to pH 4.5 with 2 N hydrochloric acid, and 24.0 g of N,N′-dimethylolurea are added. The mixture is then heated to 60° C. and 10 ml of 15% sulfamic acid are added rapidly, whereupon the mixture gels after 2 to 3 minutes. The gelled reaction mass is heated to 98° C., which causes it to melt slowly and become clear after 45 minutes. The clear reaction mass is poured out onto drying trays and subjected to condensation in a vacuum drying oven for 16 hours at 115° C. The condensate is then suspended in a small amount of water and washed with a 10% sodium carbonate solution until the wash solution has a pH of 7. The purified condensate is dried overnight at 80° C. and is then ground in a ball mill to give a powder. 74 g, corresponding to a yield of 77% of theory, of a white powder are obtained.

EXAMPLE 2

42.6 g of a 53% aqueous solution of a compound of the formula

$$NaSO_3-CH_2CH_2-CONH-CH_2OH \quad (12)$$

are mixed with 41.8 g of N,N′-dimethylolurone dimethyl ether. The mixture is warmed to 60° C. and 10 ml of 15% sulfamic acid are added, whereupon the mixture gels after 2 to 3 minutes. The gelled reaction mass is heated to 98° C. and subjected to condensation for 16 hours. The condensate is then washed with water and sodium carbonate solution, after which it is dried and ground. 15 g of a white powder are thus obtained. Yield, 35% of theory.

EXAMPLE 3

42.6 g of a 53% aqueous solution of a compound of the formula (12) are mixed with 45 g of hexamethylolmelamine. The mixture is warmed to 60° C. and 10 ml of 15% sulfamic acid are added, whereupon the mixture gels in the course of 3 minutes. The reaction mass is heated to 98° C. and is subjected to condensation for 16 hours. The condensate is washed with water and sodium carbonate solution and then dried and ground. 30 g of a white powder are obtained. Yield, 60% of theory.

EXAMPLE 4

43.5 g of a 53% aqueous solution of a compound of the formula (11) are mixed with 20 g of monomethylolurea. The mixture is warmed to 60° C. and 5 ml of 15% sulfamic acid are added, whereupon the mixture gels. The reaction mass is heated to 98° C. and is subjected to condensation for 16 hours in a drying oven at 110° C. The condensate is washed with water and sodium carbonate solution and finally dried and ground. 38 g of a white powder are obtained. Yield, 90% of theory.

EXAMPLE 5

40 g of a compound of the formula

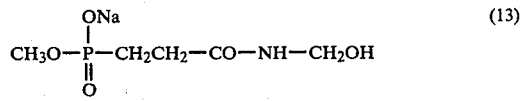

in the form of an aqueous solution are mixed with 24 g of N,N′-dimethylolurea. The mixture is warmed to 60° C. and 4 ml of 15% sulfamic acid are added, whereupon the mixture gels slowly. The gel mass is subjected to condensation in a drying oven at 100° C. for 16 hours. The condensate obtained is treated with sodium carbonate solution and is finally dried and ground. 24.5 g of a white powder are obtained. Yield, 60% of theory.

EXAMPLE 6

40 g of a compound of the formula (13), in the form of an aqueous solution, are mixed with 45 g of hexamethylolmelamine. The mixture is heated to 60° C. and 5 ml of 15% sulfamic acid are added, whereupon the reaction mixture becomes hard. The mass is heated to 98° C., whereupon it re-liquefies. The reaction mixture is poured out onto drying trays, and dried, and subjected to condensation, for 16 hours. The condensate is washed with water and sodium carbonate solution, dried and ground, giving 34 g of a white powder. Yield, 50% of theory.

EXAMPLE 7

65.3 g of a 35% aqueous solution of a compound of the formula (11) are brought to pH 4.5 with hydrochloric acid and mixed with 30.6 g of hexamethylolmelamine. The mixture is warmed to 70° C. and brought to pH 3.0 with 15% sulfamic acid, whereupon the mass gels after 2 to 3 minutes. The gelled mass is heated to 110° C. and subjected to condensation for 16 hours. The condensate is ground, washed with sodium carbonate solution and dried. 30 g of a white powder are obtained. Yield, 57% of theory.

EXAMPLE 8

65.3 g of a 35% aqueous solution of a compound of the formula (11) are brought to pH 4.5 with hydrochloric acid and mixed with 19.5 g of hexamethylolmelamine hexamethyl ether and 14.6 g of N,N′-dimethylolethyleneurea. The mixture is warmed to 70° C. and brought to pH 3.0 with 15% sulfamic acid, whereupon the reaction mass gels after 2 to 3 minutes. The gelled mass is heated to 110° C. and subjected to condensation for 16 hours. The condensate is ground, washed with sodium carbonate solution and dried. 20 g of a white powder are obtained. Yield, 35% of theory.

EXAMPLE 9

100 g of a 25% aqueous solution of a compound which essentially corresponds to the formula

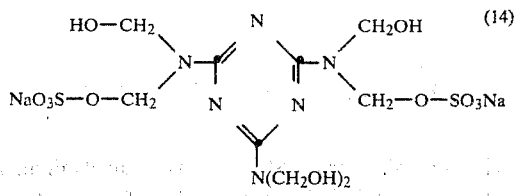

are brought to pH 4.5 with hydrochloric acid and then mixed with 39 g of hexamethylolmelamine hexamethyl ether. The mixture is warmed to 70° C. and brought to pH 3.0 with 15% sulfamic acid, whereupon it gels after 2 to 3 minutes. The gelled mass is heated to 110° C. and subjected to condensation for 16 hours. The condensate is then ground, washed with sodium carbonate solution and dried. 50 g of a white powder are obtained. Yield, 76% of theory.

EXAMPLE 10

100 g of a 25% aqueous solution of a compound of the formula (14) are brought to pH 4.5 with hydrochloric acid and mixed with 24 g of N,N'-dimethylolurea. The mixture is warmed to 70° C. and brought to pH 3.0 with 15% sulfamic acid, whereupon it gels after 2 to 3 minutes. The gelled mass is heated to 110° C. and subjected to condensation. The condensate is ground, washed with sodium carbonate solution and dried. 24 g of a white powder are obtained. Yield, 50% of theory.

EXAMPLE 11

118 g of a 23% aqueous solution of a compound which essentially corresponds to the formula

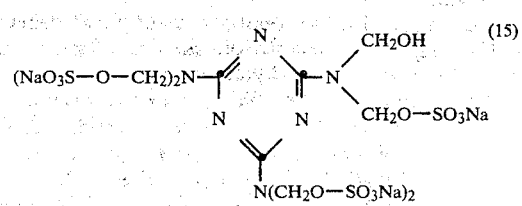

are brought to pH 4.5 with hydrochloric acid and mixed with 30.6 g of hexamethylolmelamine. The mixture is warmed to 70° C. and brought to pH 3.0 with 15% sulfamic acid, whereupon it gels after 2 to 3 minutes. The gelled mass is heated to 110° C. and subjected to condensation. The condensate is ground, washed with sodium carbonate solution and dried. 41 g of a white powder are obtained. Yield, 72% of theory.

EXAMPLE 12

22 g of a reaction product of the formula (5), obtained by reacting the sodium salt of taurine with ethylurethane, are stirred with 42 ml of water, and 15 g of a 35% formaldehyde solution are added. After the mixture has been stirred for 24 hours at a pH of 10.2, 79 g of an aqueous solution of a methylolamide compound of the formula $$NaO_3S-CH_2CH_2-NH-CO-NH-CH_2OH \qquad (16)$$

are obtained. This solution is brought to pH 4.5 with concentrated hydrochloric acid (37%), and 30.6 g of hexamethylolmelamine and 24 g of N,N'-dimethylolurea are added. The resulting mixture is warmed to 70° C. and brought to pH 3.0 with 15% sulfamic acid solution, whereupon it gels after 2 to 3 minutes. The mass is heated to 110° C. and subjected to condensation in a vacuum drying oven. The condensate is washed with sodium carbonate solution and dried. 50 g of a white powder are obtained. Yield, 70% of theory.

EXAMPLE 13

500 ml of a red residual liquor which still contains 500 mg/l of the cationic dye of the formula

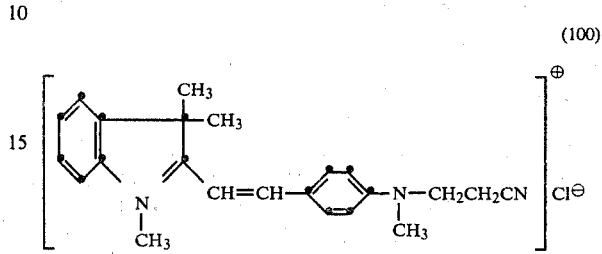

in solution, and which has been brought to a pH value of 4.5, are introduced into a stirred vessel and warmed to a temperature of 50° C., and 0.5 g of the adsorbent prepared according to Example 1 are added, as a powder. After an adsorption time of 60 minutes, the slurry is filtered through a glass fibre filter. The decoloration of the filtrate is 68.5%. The solids content of the moist filter residue is 70%.

If the adsorbent prepared according to Examples 2, 3, 4, 7, 8, 9, 10 or 11 is used instead of the adsorbent of Example 1, the decoloration achieved is 41%, 40%, 57%, 56%, 54%, 64%, 86% and 43% respectively.

EXAMPLE 14

1 Liter of a zinc chloride solution, which contains 50 mg of $Zn^{++}$ in solution and has been brought to a pH value of 5 is introduced into a stirred reactor. 5 g of the adsorbent prepared according to Example 1 are added to the liquor. After an adsorption time of 5 minutes, a sample is taken and filtered; it proves to have a zinc ion concentration of less than 1 mg/l.

EXAMPLE 15

1 Liter of a copper solution, which contains 50 mg of copper ions in solution and has been brought to a pH value of 5 is introduced into a stirred reactor. 5 g of the adsorbent prepared according to Example 1 are added to the liquor. After an adsorption time of 5 minutes, a sample is taken and filtered; it proves to have a copper concentration of less than 1 mg/l.

EXAMPLE 16

1 Liter of a silver solution, which contains 50 mg of silver ions in solution and has been brought to a pH value of 5 is introduced into a stirred reactor. 0.5 g of the adsorbent prepared according to Example 1 are added to the liquor. After an adsorption time of 5 minutes, a sample is taken and filtered; it proves to have a silver concentration of 3.8 mg/l.

What is claimed is:
1. An anionic adsorbent obtained by reaction of
   (a) a monomeric compound which contains at least one anionic group and at least one free or methylolated amide group, with
   (b) an aminoplast precondensate which is free from salt-forming anionic groups.

2. An adsorbent according to claim 1, wherein the components (a) and (b) together contain at least two free or etherified methylolamide groups.

3. An adsorbent according to claim 1, wherein the amide group is a carboxamide group.

4. An adsorbent according to claim 1, wherein component (a) is an anionic compound of the formula $$Z-Q-CO-\underset{\underset{Y}{|}}{N}-X \quad (1)$$

wherein

X is hydrogen or —CH$_2$OH,

Y is hydrogen, lower alkyl or —CH$_2$OH,

Q is alkylene having 1 to 8 carbon atoms, and

Z is the carboxyl group or the acid radical of a polybasic, inorganic oxyacid, or —CO—Q—Z is the acid radical of a dicarboxylic acid containing this inorganic acid radical, in which the terminal carboxyl group of the dicarboxylic acid is free or replaced by a group of the formula $$X-\underset{\underset{Y}{|}}{N}-CO- \quad (1a)$$

5. An adsorbent according to claim 4, wherein component (a) is a compound of the formula (1), wherein Z is a sulfonic acid group or phosphoric acid group.

6. An adsorbent according to claim 4, wherein component (a) is a compound of the formula (1), wherein Q is C$_2$–C$_3$-alkylene.

7. An adsorbent according to claim 4, wherein component (a) is a compound of the formula $$Z_1-Q_1-CO-\underset{\underset{Y}{|}}{N}-CH_2-OH \quad (2)$$

wherein Q$_1$ is C$_1$–C$_3$-alkylene which is unsubstituted or substituted by —COOH or by the group of the formula (2a)

$$-CO-\underset{\underset{Y}{|}}{N}-CH_2OH,$$

and Z$_1$ is —SO$_3$M or $$-\underset{\underset{OR}{|}}{\overset{\overset{O}{\|}}{P}}-OM,$$

R is lower alkyl or M, M is hydrogen, an alkali metal or ammonium and Y is hydrogen, lower alkyl or —CH$_2$OH.

8. An adsorbent according to claim 7, wherein component (a) is a compound of the formula (2), wherein Q$_1$ is C$_2$–C$_3$-alkylene, Z$_1$ is —SO$_3$M and Y is hydrogen or —CH$_2$OH.

9. An adsorbent according to claim 1, wherein component (a) is a methylolmelamine compound of the formula

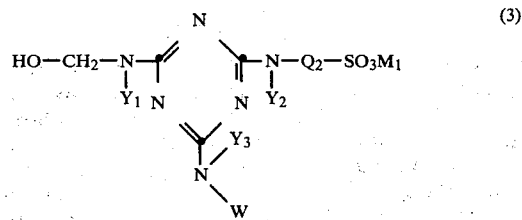

wherein W is hydrogen, —CH$_2$OH or —Q$_2$—SO$_3$M$_1$, Y$_1$ is hydrogen, lower alkyl, —CH$_2$OH or —Q$_2$—SO$_3$M$_1$, Y$_2$ and Y$_3$, independently of one another, are hydrogen, lower alkyl or —CH$_2$OH, Q$_2$ is C$_2$–C$_3$-alkylene and M$_1$ is hydrogen, sodium, potassium or ammonium.

10. An adsorbent according to claim 1, wherein component (a) is a hexamethylolmelamine which contains one to five sulfated methylol groups.

11. An adsorbent according to claim 1, wherein component (b) is a methylolated urea or amino-1,3,5-triazine, either of which is unetherified or etherified.

12. An adsorbent according to claim 11, wherein component (b) is an N-methylolurea or N-methylolmelamine.

13. An adsorbent according to claim 12, wherein component (b) is monomethylolurea, dimethylolurea or tri- to hexamethylolmelamine.

14. An adsorbent according to claim 1 obtained by reaction of components (a) and (b) in a ratio of 1 mol of component (a) and 0.2 to 10 mols of component (b).

* * * * *